(12) United States Patent
Weisgerber et al.

(10) Patent No.: US 12,163,337 B2
(45) Date of Patent: Dec. 10, 2024

(54) CLADDING INSTALLATION SUPPORT

(71) Applicant: 1947742 Alberta Ltd., Rocky View (CA)

(72) Inventors: Tyler Weisgerber, Rocky View (CA); Trevor Kent, Rocky View (CA)

(73) Assignee: 1947742 ALBERTA LTD., Rocky View (CA)

( * ) Notice: Subject to any disclaimer, the term of this patent is extended or adjusted under 35 U.S.C. 154(b) by 254 days.

(21) Appl. No.: 17/937,966

(22) Filed: Oct. 4, 2022

(65) Prior Publication Data

US 2023/0116338 A1 Apr. 13, 2023

Related U.S. Application Data

(60) Provisional application No. 63/253,457, filed on Oct. 7, 2021.

(51) Int. Cl.
*E04F 13/08* (2006.01)
*E04F 21/18* (2006.01)
*F16B 15/00* (2006.01)

(52) U.S. Cl.
CPC .......... *E04F 13/08* (2013.01); *E04F 21/1855* (2013.01); *F16B 15/0046* (2013.01)

(58) Field of Classification Search
CPC .... E04F 13/08; E04F 21/1855; F16B 15/0046
USPC .. 248/689, 299.16, 299.26, 248, 247, 316.1; 52/506.06, 36.5
See application file for complete search history.

(56) References Cited

U.S. PATENT DOCUMENTS

| | | | | |
|---|---|---|---|---|
| 3,131,447 A | * | 5/1964 | Tinnerman | F16L 3/24 248/300 |
| 3,208,119 A | * | 9/1965 | Seckerson | F16B 5/121 52/712 |
| 3,780,209 A | * | 12/1973 | Schuplin | H02G 3/125 24/336 |
| 5,188,318 A | * | 2/1993 | Newcomer | H02G 3/24 248/68.1 |
| 6,227,507 B1 | * | 5/2001 | Kallio | A47B 96/024 248/248 |
| 6,532,704 B2 | * | 3/2003 | Hart | E06B 9/02 248/248 |

(Continued)

FOREIGN PATENT DOCUMENTS

| CA | 2763058 | 10/2014 |
|---|---|---|
| CA | 2784018 | 12/2019 |

OTHER PUBLICATIONS

ISO Clip brochure, May 4, 2021, 2 pages.

*Primary Examiner* — Paola Agudelo
(74) *Attorney, Agent, or Firm* — ARENTFOX SCHIFF LLP (57) ABSTRACT

A cladding support device comprises a folded sheet metal body. The folded sheet method body includes a base wall, a top wall portion protruding out relative to the base wall, a side wall protruding from the base wall and having an upper edge adjacent the top wall portion; and a clamp on the top wall portion, the clamp including a substantially planar body with side edges extending between a coupled end to which the clamp is coupled to the sheet metal body and an outboard end and the clamp being positioned on the top wall with one side edge extending along the upper edge of the side wall.

10 Claims, 10 Drawing Sheets

(56) References Cited

U.S. PATENT DOCUMENTS

| | | | | |
|---|---|---|---|---|
| 7,429,023 B2* | 9/2008 | Morrow | ............... | E04B 1/003 |
| | | | | 52/715 |
| 7,686,625 B1* | 3/2010 | Dyer | ................. | H01R 11/22 |
| | | | | 439/907 |
| 8,746,633 B1* | 6/2014 | Medlin, Jr. | ............ | H02G 3/32 |
| | | | | 248/65 |
| 8,770,526 B2* | 7/2014 | Siddiqui | ............ | H02G 3/125 |
| | | | | 248/200.1 |
| 8,967,423 B2* | 3/2015 | Sharpe | ................ | A47G 29/14 |
| | | | | 248/318 |
| 9,151,058 B1* | 10/2015 | Leathe | ................ | E04B 1/003 |
| 10,847,960 B1* | 11/2020 | Naugler | ............. | H02G 3/32 |
| 11,286,676 B2* | 3/2022 | Nelson | ............. | E04F 13/0862 |
| 11,754,219 B1* | 9/2023 | Keffeler | ............. | F16M 13/02 |
| | | | | 248/316.1 |
| 2005/0092510 A1* | 5/2005 | Dinh | ................. | H02G 3/125 |
| | | | | 174/58 |
| 2006/0080934 A1* | 4/2006 | Petrova | ............ | F16B 15/0046 |
| | | | | 52/848 |
| 2015/0366348 A1* | 12/2015 | Abell | ............... | A47B 83/001 |
| | | | | 52/36.5 |
| 2016/0167211 A1* | 6/2016 | Dengel | ............... | B25C 3/006 |
| | | | | 29/721 |
| 2017/0114950 A1* | 4/2017 | Ziaylek | ............... | F16M 13/00 |
| 2021/0239145 A1* | 8/2021 | Erekson | ............... | F16B 5/0635 |
| 2024/0093481 A1* | 3/2024 | Brekke | ............... | E04B 1/2612 |

* cited by examiner

PRIOR ART

CLADDING INSTALLATION SUPPORT

CROSS REFERENCE TO RELATED APPLICATIONS

This application claims priority from U.S. 63/253,457, filed Oct. 7, 2021, the contents of which are incorporated by reference herein.

TECHNICAL FIELD

The apparatus and method disclosed herein relates to a support useful for supporting cladding components on a building or building component.

BACKGROUND

In constructing buildings, it is common to attach cladding components (e.g., beams, purlins, panels, roofing, etc.) to supportive building structures (e.g., steel stud wall studs, concrete or masonry walls, floors, roofs, and other back-up supports). In many applications, it is preferable to provide a space between the cladding components and the building structures. This is typically done by attaching cladding components with supports to the building structure.

Figure 1:
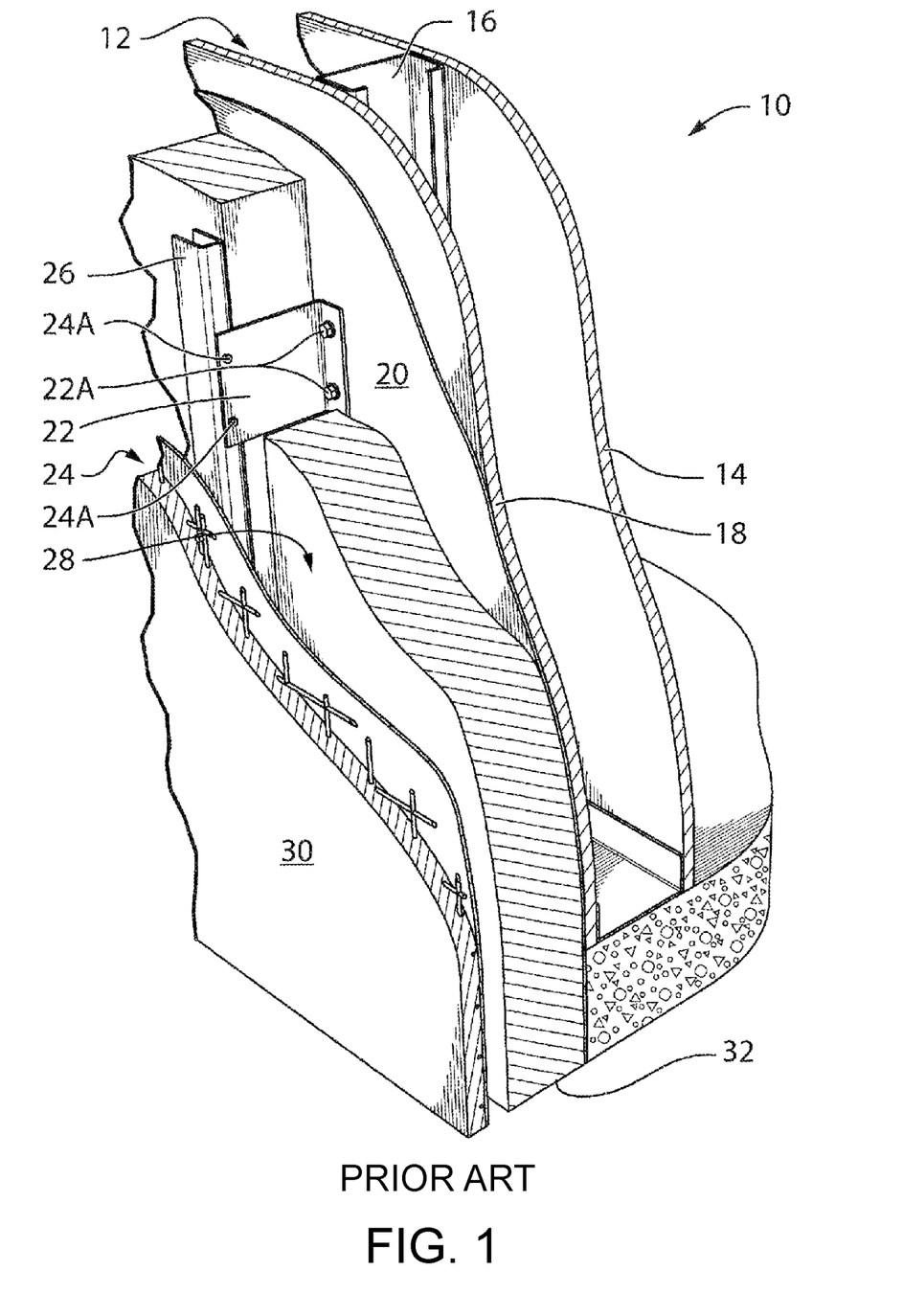
FIG. 1 is a prior art assembly of a cladding support in a wall construction.

FIG. 1 is a perspective view of an exterior wall assembly 10 that illustrates use of prior art supports to connect cladding components to supporting building structures. Assembly 10 comprises a wall 12 formed by interior finish 14 such as a drywall board, a C-shaped steel stud 16, and an exterior wall panel or sheathing 18. A moisture barrier 20 may cover exterior wall sheathing 18. A support 22 is attached to steel stud 16 by screws 22A that pass through barrier 20, exterior wall sheathing 18 and at least a portion of stud 16. Support 22 shown in FIG. 1 is one of a plurality of like supports attached to wall 12 in spaced apart, vertically aligned relation. Alternatively, continuous beams are also used to achieve this function. Support 22 connects cladding components 24, which may consist of supporting cladding framework such as elongate vertical steel beam 26, and exterior finish 30 (e.g., stucco, metal panels, etc.), to wall 12. Beam 26 is attached by fasteners, such as screws 24A, to support 22. Insulation 32 may be provided in the space between wall 12 and cladding components (24, 26, and 30), and an air cavity and/or moisture drainage cavity 28 may be provided.

In assembly 10, support 22 must have sufficient strength and rigidity to support the cladding under the various loads it faces (gravity, wind, seismic, etc.). Sheet steel supports are known, such as the one illustrated in FIG. 1. However, they can be flimsy. This is especially problematic when securing a horizontal beam. Sagging and flexing can occur and if the solution is to add more supports, this increases material and time costs and does not allow for easy adjustment of the cladding component on the numerous supports. Also, because supports extend from the building structure to the cladding, cladding supports can create a thermal loss path from the building structure to the exterior of the building. If the supports are not durable, so many supports are required that a significant and problematic thermal loss occurs through the wall.

To overcome this problem, polymeric, fiberglass or cast metal supports have been introduced for their strength and stiffness characteristics. However, because so many supports are required, more expensive, heavier, complicated and multi-part support structures are difficult to justify in the construction industry.

Accordingly, a support and method is needed that is simple but adaptable for adjustment and a variety of uses.

SUMMARY OF THE INVENTION

Thus, in an exemplary embodiment, a cladding installation support device comprising: a folded sheet metal body including: a base wall; a side wall protruding from the base wall and having an upper edge; a top wall portion protruding out substantially orthogonally relative to the base wall, the top wall portion including a clamp, the clamp including side edges extending between a coupled end to which the clamp is coupled to the folded sheet metal body and an outboard end, and the clamp having one side edge extending along the upper edge of the side wall.

Moreover, according to another exemplary aspect, there is provided method of constructing a cladding support device, the method comprising: bending an L-shaped piece of sheet steel to create a base, a top wall portion extending substantially orthogonal from the base and a side wall extending substantially orthogonal from the base, such that the top wall portion is adjacent and extends along a top edge of the side wall and each of the top wall portion and the side wall have front edges opposite to the base; and bending a portion of the top wall portion into a clamp.

Moreover, according to another exemplary aspect, there is provided a method for installing a cladding component to a building structure at a worksite, the method comprising: securing a hook through a hanging port of a cladding support device to secure the cladding support device to a worker or a fixed structure at the worksite; driving a fastener through a base wall of the cladding support device to secure the cladding support device against the building structure; after driving a fastener, removing the hook from the hanging port; and inserting the cladding component into a clamp on the cladding support device.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and form a part of this specification, illustrate one or more example aspects of the present disclosure and, together with the detailed description, serve to explain their principles and implementations.

DETAILED DESCRIPTION

Various aspects of the invention are now described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 2:
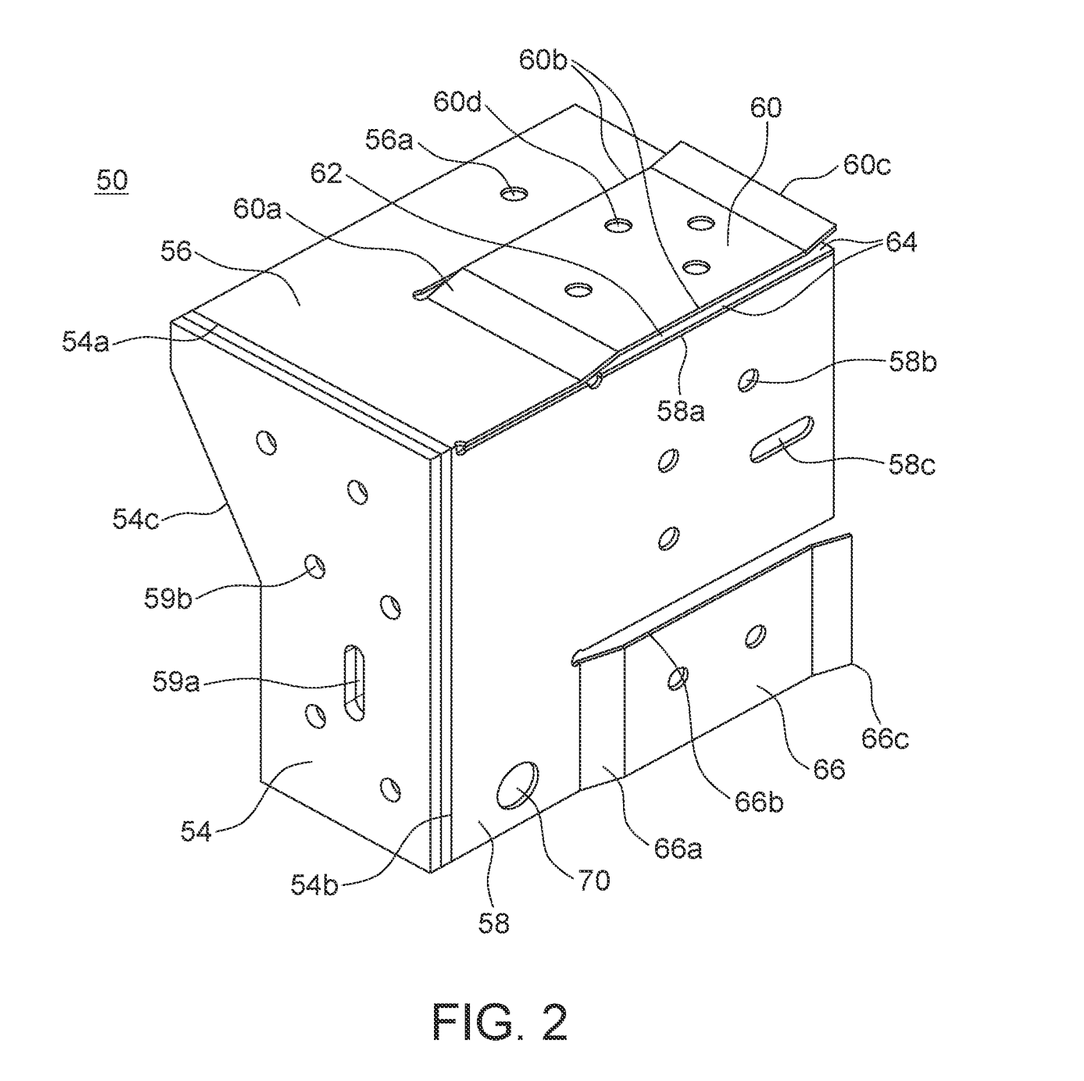
FIG. 2 is a rear, top, first side isometric view of a cladding support according to the present invention.
Figure 3:
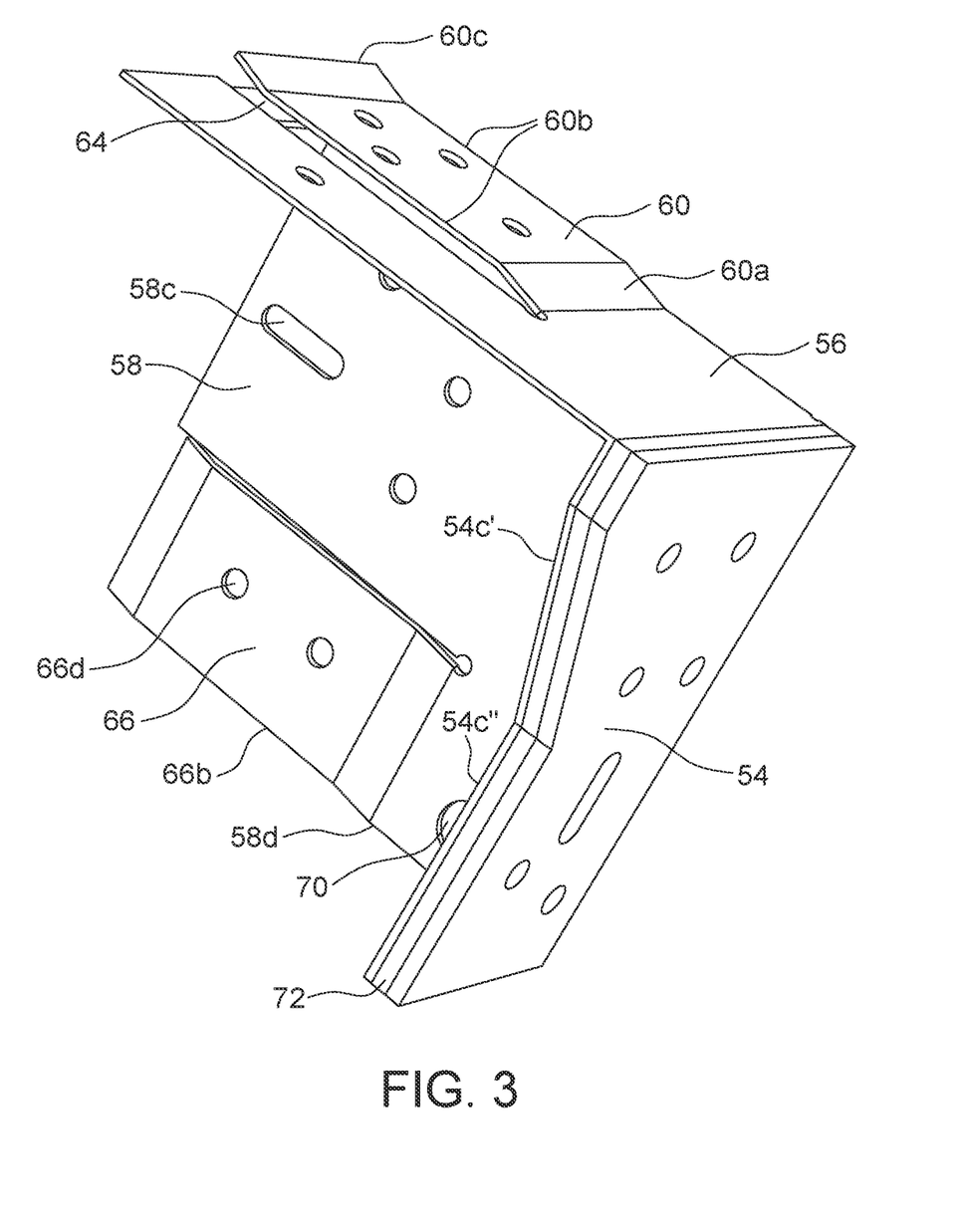
FIG. 3 is a rear, top, isometric view of a cladding support similar to that of FIG. 2 but illustrated from a side opposite from that of FIG. 2.
Figure 4:
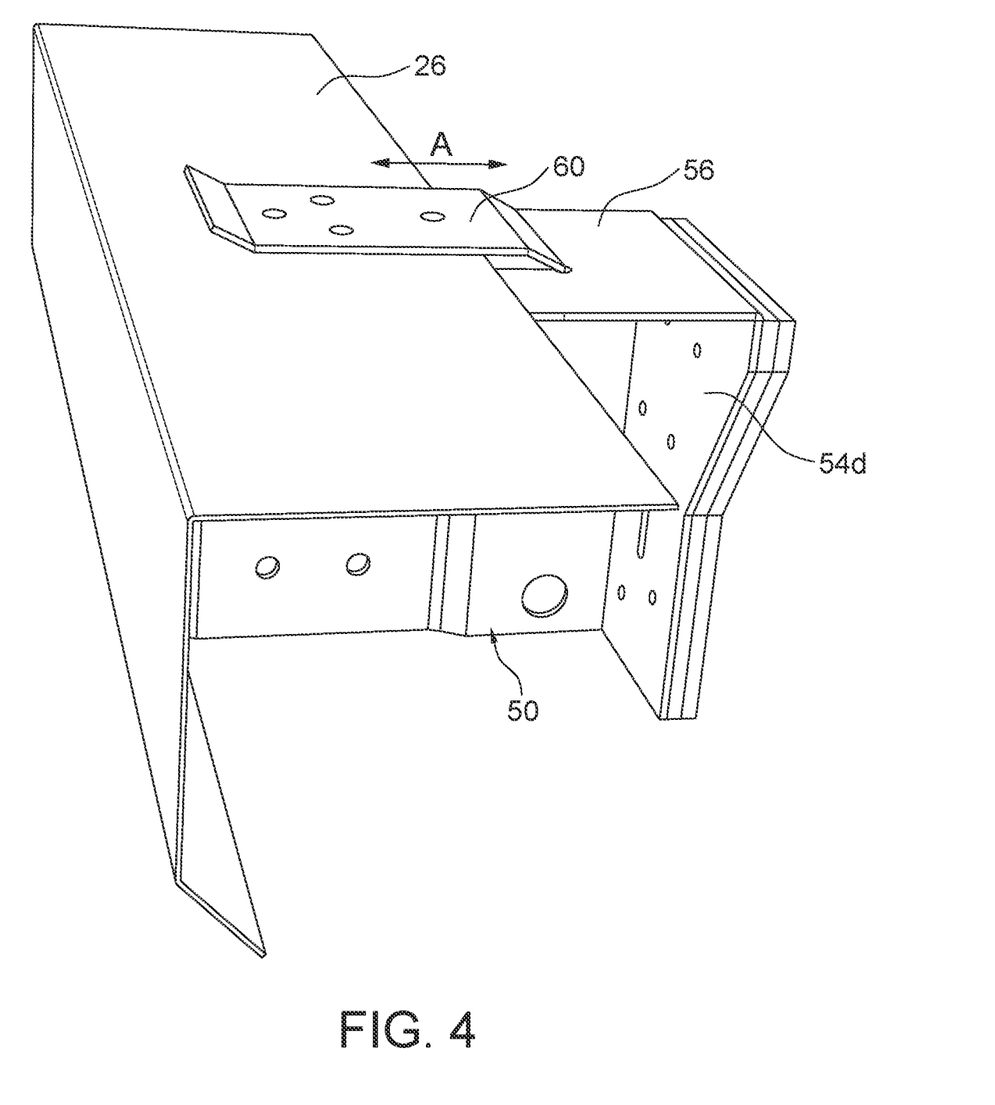
FIG. 4 is a cladding support similar to that of FIG. 2 with a horizontal beam installed thereon.

FIGS. 2, 3 and 4 show different views of a cladding support 50 according to an example embodiment. The cladding support is sometimes referred to as a "clip". More particularly: FIG. 2 is a perspective view of support 50 from the rear, top and first side thereof; FIG. 3 is also a top, rear perspective view of support 50 but from the opposite side compared to FIG. 2; and FIG. 4 is a perspective view of support 50 showing a beam 26 supported thereon.

Support 50 may be used for spacing a cladding component, such as beam 26 from a building structure.

Support 50 is constructed of sheet metal such as galvanized sheet steel or stainless steel, which is strong but light weight. The support focuses on the structures that act to secure the cladding components to further reduce the weight. Further, support 50 is specifically constructed to overcome difficulties of sagging and inadequate support inherent with prior galvanized sheet metal supports, while permitting adjustment to be more generally useful.

Cladding support 50 comprises a base 54 through which the support is secured to the building structure. Base 54 has an upper edge 54*a*, a first side edge 54*b* adjacent to and extending away from the upper edge and a second side edge 54*c* extending away from the upper edge opposite the first side edge. Base 54 is overall substantially planar at least on its rear side. A portion, herein referenced as top wall 56, extends out from upper edge 54*a* generally orthogonally from base 54 and a side wall 58 extends out from first side edge 54*b* generally orthogonally from base 54. The terms top and side are employed for convenience to permit these walls to be readily differentiated herein and because the usual orientation of the support 50 is with top wall facing up. However, it is to be understood that the support can be employed such that the wall, herein termed as side wall 58 is facing upwardly.

The top wall and the side wall are on adjacent edges of the base and, as such, a corner is formed between base 54, top wall 56 and side wall 58.

In the illustrated embodiment, support 50 is generally elongate, where side edge 54*b* is longer than top edge 54*a*, though this is not necessary.

Second side edge 54*c* is free of any wall extending therefrom such that access can be readily had to the front side 54*d* of base, the underside of wall 56 and the inner facing side of wall 58. While second side edge 54*c* could extend parallel to first side edge 54*b*, in one embodiment the second side edge 54*c* of base 54 extends downwardly and inwardly toward the first side edge. In other words, the side to side width of base 54 between the side edges tapers toward the lower end of the base. This minimizes the amount of material needed to form base 54 and also limits the amount of material secured against the building structure, which thereby limits the surface area through which thermal transfer can occur. Second side edge 54*c* may taper inwardly in various ways. In the illustrated embodiment, the second side edge tapers at its upper end 54*c'* and then extends parallel to the first side edge at its lower end 54*c"*.

Base 54 has a plurality of apertures 59*a*, 59*b* for receiving fasteners for securing to the building structure. Base 54 may include one or more elongate, for example slot-shaped, apertures 59*a* that permit locational adjustment of the base along the building structure after a fastener is inserted through the aperture and threaded into the building structure. The slot shaped aperture may be positioned on base 54 with its elongate dimension extending in a substantially vertical direction, for example substantially parallel to the side wall 58, such that the location of the support 50 can be adjusted to move top wall 56 up and down after the fastener is inserted. That or another slot shaped aperture may be angled off parallel from side wall 58, to allow the cladding support 50 to be installed at various angles (i.e. the side wall 58 not vertical), if required/desired. Base 54 may also include one or more circular shaped apertures 59*b* for accepting further fasteners and securing the cladding support in a fixed position to a building structure.

Top wall 56 includes a clamp 60 configured to locate a cladding component, such as a beam 26, supported on top wall 56. In the illustrated embodiment, clamp 60 is defined as a planar body coupled at a coupled end 60*a* to the support but is free from any connection to the support along its side edges 60*b* and at its outboard end 60*c*. A slot 62 is formed at the underside of clamp 60, in this case between the planar surface of top wall 56 and the underside of clamp 60. Slot 62 opens towards, and possibly along, the front edge of wall 56. In one embodiment, for example, outboard end 60*c* extends along a line substantially parallel with the intersection between base 54 and wall 56. Side edges 60*b* of the clamp extend back from the outboard end towards base 54. The underside of clamp 60 is offset from, for example, spaced above, the plane of top wall 56, so that slot 62 is defined as the gap between the planar expanse of the top wall and the clamp. Clamp 60 can resiliently flex relative to top wall 56 so that slot 62 can be urged further open, but will resiliently return to its neutral position when the force is removed. In operation, an edge of a cladding component can be inserted into slot 62 and secured under clamp 60, for example clamped or pinched between clamp 60 and the rest of the support, such as top wall 56. If the cladding component has a length greater than the side edge 60b to side edge 60b width of the clamp, the cladding component extends out from under clamp 60.

In one embodiment, the underside of clamp 60 is spaced above, but in a parallel plane, to the upper surface of top wall 56. In one embodiment, outboard end 60c is angled up away from top wall 56 to create the space. The size of the slot facilitates insertion of a cladding component into the slot. The height of slot 62, or in other words the size of the gap between the underside of clamp 60 and the top wall, is generally selected to be about the same as the thickness of the cladding component to be inserted into the slot.

The length of side edges 60b determine how far a cladding component can be inserted into the slot, with the coupled end 60a creating a stop which may be used to limit the advancement of a cladding component over top wall 56. For example, a cladding component may be located on support 50 by inserting the component into slot 62 and pushing the component into the slot 62 to a selected degree up to and until the component butts against coupled end 60a of the clamp. In the illustrated embodiment, the stop provided by the coupled end is generally parallel to base 54 of support 50. One or more indicators, such as a hole in clamp 60 may be used to indicate the minimum amount of insertion.

FIG. 4 shows a beam 26 inserted into slot 62 and held under clamp 60. The flex in the clamp pinches the beam between the clamp and top wall 56. In one embodiment, the clamp is sized to provide for up to 305 mm depth of penetration. In particular, side edges 60b are up to 305 mm long between outboard end 60c and coupled end 60a. As such, the beam 26 can be inserted under the clamp and adjusted, arrows A, to any depth of penetration between the minimum and the coupled end.

Figure 5:
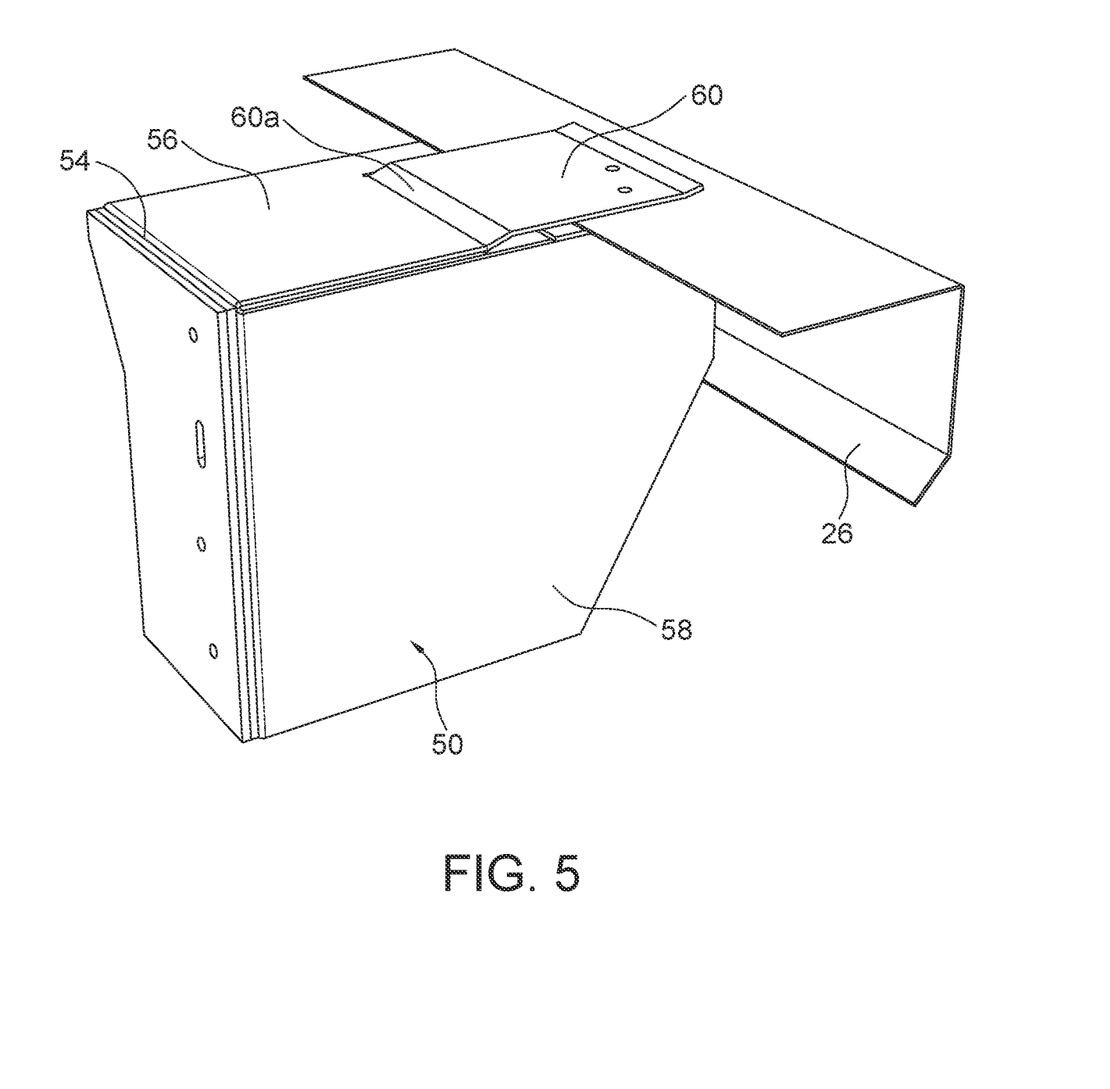
FIG. 5 is a rear, top, first side isometric view of another cladding support according to the present invention with a horizontal beam installed thereon.

The distance between clamp 60 and base wall 54 may be selected depending on how far the cladding is to be spaced from the building structure. For example in FIG. 2, the distance between the clamp's connected end 60a and base wall 54 is smaller than that distance in FIG. 5.

The clamp includes a plurality of pre-punched fastener holes 60d at different distances from outboard end 60c so that regardless of the depth of penetration, a fastener can be inserted through a hole 60d to engage in the beam in slot 62.

There may also be a pre-punched hole 56a in wall 56. This may be a fastener hole 56a or an indicator hole for guiding the minimum insertion. The hole 56a may be near the front edge of the wall, aligned with the clamp so that a beam inserted under clamp 66 overlies the hole 56a.

In one embodiment, to strengthen the support and avoid sagging of wall 56 under the weight of a connected beam, one side of the clamp 60 is positioned near or at the corner between top wall 56 and side wall 58. Thus, in the illustrated embodiment, one side edge 60b extends directly along the corner between the walls. One side edge 60b is therefore above and substantially aligned along the side wall 58. In one embodiment, for example, the slot 62 is defined as the space spanning between top wall 56 and the clamp on one side and the space between the clamp and the upper limit 58a of side wall 58 on the other side. As such, a portion of the weight of any beam 26 installed under clamp 60 is borne by side wall 58 and that weight is effectively distributed into the plane of the side wall 58.

In one embodiment, a wall portion 64, which is a part of top wall 56 or is coplanar or in a close and parallel plane with the top wall 56, extends below clamp 60. Portion 64 may extend only near the front of the slot such as shown in FIG. 3 or, such as shown in FIG. 2, may extend across more of the depth of the slot. Wall portion 64 creates a bottom wall for the slot and creates a floor for the slot against which any beam inserted into slot can be biased by clamp 60. As such, any beam 26 inserted into slot 62 is clamped between clamp 60 and wall portion 64. Wall portion 64 may be secured to side wall 58, for example at edge 58a. Wall portion 64 may also include pre-punched fastener holes 60d' (FIG. 6) that align below fastener holes 60d on clamp 60. These pre-punched fastener holes 60d' may be sized to act as pilot holes. For example, pilot holes 60d' may have a diameter smaller than the fastener holes 60d on clamp 60.

Support 50 in some embodiments is useful for accepting securement of horizontal cladding components under clamp 60 or vertical cladding components on side wall 58. Of course, support 50 could simply be turned to orient top wall 56 with its plane in a vertical orientation to accept vertical components under clamp 60. However, side wall 58 has a length along an edge of base that is longer than top wall 56, and thereby is better configured to support the weight of a vertical component.

Side wall 58 may therefore include pre-punched fastener holes 58b, 58c for receiving fasteners for securing a vertical cladding component such as a vertical beam see for example, the vertical orientation of the beam shown in FIG. 1. Side wall 58 may include one or more elongate, for example slot-shaped, apertures 58c that permit locational adjustment of the component on the support after a fastener is inserted through the aperture and threaded into the side wall. The slot shaped aperture may be positioned on the side wall with its elongate dimension extending parallel to the depth of the side wall, such that the space between the cladding component and the base 54, and thereby the building structure, can be adjusted after the fastener is inserted. One or more circular shaped apertures 58b are also provided for accepting further fasteners and securing the cladding support in a fixed position to support 50.

Side wall 58 in some embodiments such as that of FIG. 2-4, also includes a clamp 66 configured to receive a cladding component, such as a vertical beam. In the illustrated embodiment, clamp 66 is similar in construction to clamp 60, as described above. In particular, clamp 66 is a generally planar body coupled at a coupled end 66a to side wall 58 but is free from any connection to the support and the side wall along its side edges 66b and at its outboard end 66c. A slot is formed between the planar surface of side wall 58 and the underside of clamp 66. The slot opens towards, and possibly along, the front edge of wall 58. In one embodiment, for example, outboard end 66c extends along a line substantially parallel with the front edge of wall 58 and side edges 66b of the clamp extend back from the outboard end towards base 54. The underside of clamp 66 is offset from, for example, spaced above, the plane of side wall 58, so that the slot is defined as the gap between the side wall and the clamp. Clamp 66 can resiliently flex relative to side wall 58 so the slot can be urged further open, but will resiliently return to its neutral position when the force is removed. In operation, an edge of a cladding component can be inserted into slot 62 and secured between side wall 58 and clamp 66. If the cladding component has a length greater than the side edge 66b to side edge 66b width of the clamp, the cladding component extends out from under clamp 66 alongside wall 58.

In one embodiment, the underside of clamp 66 is spaced above, but in a parallel plane, to the planar surface of side wall 58. In one embodiment, outboard end 66c is angled up away from side wall 58 to create the space. The size of the slot facilitates insertion of a cladding component into the slot. The size of the space between the underside of clamp 66 and the side wall is generally selected to be about the same as the thickness of the cladding component to be inserted into the slot.

The length of side edges 66b determine how far a cladding component can be inserted into the slot, with the coupled end 66a creating a stop which may be used to limit the advancement of a cladding component over side wall 58. For example, a cladding component may be located on support 50 by inserting the component between outboard end 66c and side wall 58 and pushing it into the slot 62 to a selected degree up to and until the component butts against coupled end 66a of the clamp. In the illustrated embodiment, the stop provided by the coupled end is generally parallel to base 54 of support 50.

The distance between clamp 66 and base wall 54 may be selected depending on how far the cladding is to be spaced from the building structure.

The side wall clamp includes a plurality of pre-punched holes 66d at different distances from outboard end 66c. These holes are warning holes and act as an indicator for minimum insertion.

Clamp 66 can be positioned anywhere on wall 58, but in one embodiment is positioned at a lower edge 58d of wall 58 away from the corner between the side wall and the top wall. For example, the side wall's clamp may have one of its edges 66b extending in line with lower edge 58d, there being no portion of wall 58 extending down below the clamp.

Support 50 may include a hanging port 70 for storing on a hook such as a clip, pin, lanyard or carabineer. For example, support 50 may be carried and stored by hanging on a hook or a plurality of supports may be carried together on a hook such as a carabineer or cable by passing the hook through the hanging port. Hanging port 70 has a diameter much larger than any hole for indicating or receiving a fastener (i.e. the small diameter on a slot or the diameter on a regular fastener hole). For example, hanging port 70 has a diameter about three or four times larger than any fastener, pilot or indicator hole on the support. The hanging port may be positioned near the unconnected edge of base 54, top wall 56 or side wall 58. As such, a plurality of supports 50 can be hung together with a common hook, such as on a carabineer off a worker's belt, inserted through their ports 70 and with their corners (i.e. the intersection between walls 54, 56, 58) nested together. In one embodiment, hanging port 70 is positioned on side wall 58 near its bottom edge. In other words, hanging port 70 may extent through the side wall and be positioned close to edge 58d, closer to edge 58d than edge 58a, which is where the top portion intersects the side wall. In FIG. 2, hanging port 70 is positioned between base 54 and connected end 66. This position near lower edge 58d allows the supports 50 to be hung from the hook in a convenient manner and the hook can remain attached even while the support is being secured to a building structure. This, therefore, avoids the support from being dropped accidentally during installation.

To avoid heat transfer through the support, base 54 may include a layer of thermal insulation 72 such as a layer of one or more of wool, felt, fiberglass, aluminum or wall sheeting such as plywood, gypsum board or the like.

FIGS. 7 to 12 show views of another cladding support 150. While the parts may not be identical to those described above, similar reference numbers are employed for similar parts. Support 150 may also be used for spacing a cladding component, such as beam 26 from a building structure. It has many features in common with support 50 of FIGS. 2 to 5 and that description applies for support 150, but some changes and improvements have been made, which are described below.

Support 150 is constructed of sheet metal such as galvanized sheet steel or stainless steel.

As with cladding support 50, cladding support 150 comprises a base 54 through which the support is secured to the building structure. Base 54 has an upper edge 54a, a first side edge 54b adjacent to and extending away from the upper edge and a second side edge 54c extending away from the upper edge opposite the first side edge. Base 54 is overall substantially planar at least on its rear side. A portion, herein referenced as top wall portion 56, extends out from upper edge 54a generally orthogonally from base 54 and a side wall 58 extends out from first side edge 54b generally orthogonally from base 54. The terms top and side are employed for convenience to permit these walls to be readily differentiated herein and because the usual installed orientation of the support 150 is with top wall portion on the top and side wall 58 substantially vertically oriented and extending below the top wall portion. However, it is to be understood that the support can be employed such that the wall, herein termed as side wall 58 is on top, which is still vertically extending but oriented above the portion 56.

The top wall portion and the side wall are on adjacent edges of the base and, as such, a corner is formed between base 54, top wall portion 56 and side wall 58.

In the illustrated embodiment, support 150 is generally elongate, where side edge 54b is longer than top edge 54a, though this is not necessary.

Figure 8:
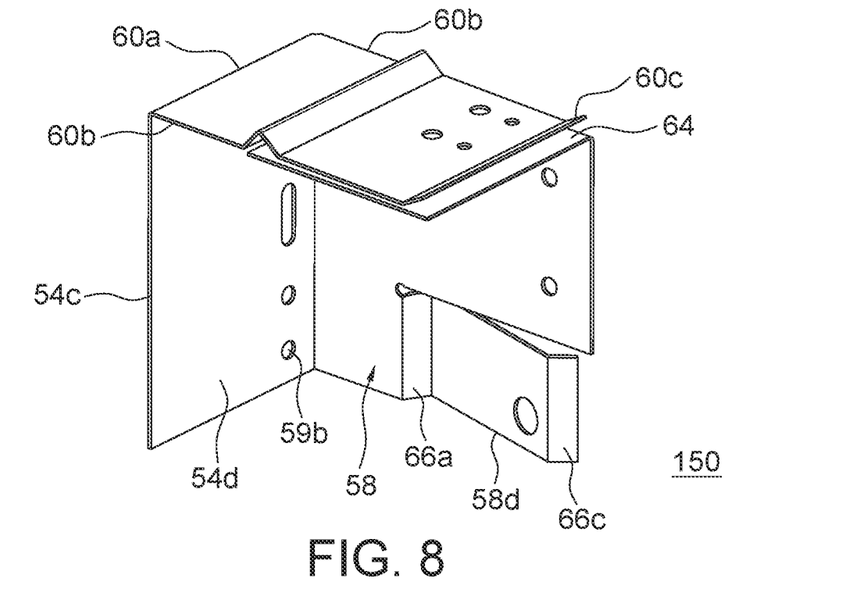
FIG. 8 is a front, top, open side, isometric view of a cladding support similar to that of FIG. 7 but with the side wall on the opposite side.
Figure 9:
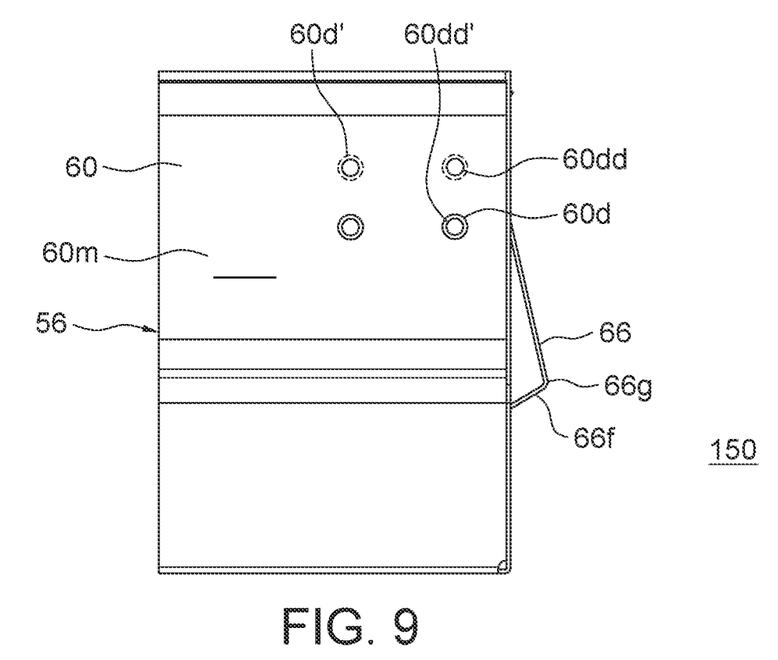
FIG. 9 is a top plan view of the cladding support of FIG. 7.
Figure 10:
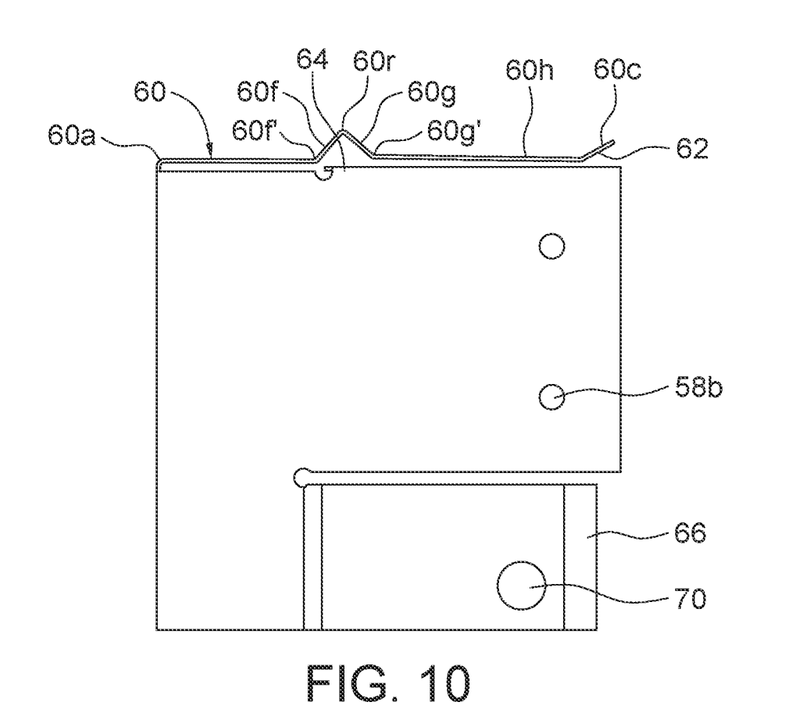
FIG. 10 is a side elevation of the cladding support of FIG. 7.

Second side edge 54c is free of any wall extending therefrom such that access can be readily had to the front side 54d of base (visible in FIG. 8), the underside of wall 56 and the inner facing side of wall 58, which is the side of the side wall visible in FIG. 8.

As with FIGS. 1 to 4, base 54 has a plurality of apertures 59a, 59b for receiving fasteners for securing to the building structure. Herein, the apertures are all limited to a position near the corner between base 54 and side wall 58, for example closer to side edge 54b than to side edge 54c. For example, apertures 59a, 59b may be lined up in a substantially straight line that is parallel to side edge 54b. There are no other apertures on the base 54 apart from those aligned close to the corner, which ensures that the apertures can be readily aligned along a stud and all fasteners are installed into a wall stud. Because there are no base apertures apart from those aligned along the corner, this avoids the wasteful and less effective installation of fasteners through base 54 into wall structures apart from the studs.

Top wall portion 56 includes a clamp 60 configured to locate a cladding component, such as a beam 26, supported by top wall portion 56. In the illustrated embodiment, clamp 60 extends the full width of the top wall portion. As above, clamp 60 has a body coupled at a coupled end 60a to the support but is free from any connection to the support along its side edges 60b and at its outboard end 60c. In this illustrated support 150, coupled end 60a is close to or at the base 54. In particular side edges 60b, extend the full side lengths of upper wall portion from outboard end 60c all the way back to base 54. Therefore, in effect, clamp 60 defines the full uppermost surface of top wall portion 56 and of support 150.

A wall portion 64 of top wall portion 56 underlies the clamp 60. Wall 64 creates a bottom wall for a slot 62. Wall portion 64, as noted above, creates a floor for the slot against which any beam inserted into the slot can be biased by clamp 60. As such, any beam 26 inserted into slot 62 is clamped between clamp 60 and wall portion 64. Wall portion 64 may be secured to side wall 58, for example at edge 58*a* and in this illustration wall portion 64 extends below substantially the full width from side 60*b* to side 60*b* of the clamp.

Clamp 60 is configured to have a greater degree of bias downwardly, towards wall portion 64, than the clamp of support 50. In particular, clamp 60 is biased downwardly in its neutral position so that a portion adjacent outboard end 60*c* is closely positioned, or actually pressing against, wall portion 64. A portion of the underside of clamp 60 is offset from, for example, spaced above, the overall plane of top wall portion 56, such as that plane defined by wall portion 64, but the clamp slopes down such that outboard end 60*c* pinches close to the plane of the wall portion 64. Clamp 60 can resiliently flex relative to the part of the support to which it is connected so that slot 62 can be urged further open, but will resiliently return to its neutral position when the force is removed. In operation, an edge of a cladding component 26 can be inserted into slot 62 (FIGS. 11 and 12) and secured under clamp 60, for example clamped or pinched between clamp 60 and the rest of the support, such as wall portion 64.

The enhanced bias in clamp 60 is provided by an angled section of the clamp. In this embodiment, the angled section includes an upwardly angled side 60*f* between two creases 60*f*, 60*r* and a downwardly angled side 60*g* that extends down from crease 60*r* to another crease 60*g'*. Together angled sides 60*f*, 60*g* create an upwardly protruding ridge section that extends from side to side on the clamp. The downwardly angled side 60*g* is bent to angle, bias the clamp down towards underlying wall portion 64. In section, the two angled sides 60*f*, 60*g* have an angle between them of 70-110°. In one embodiment, the angled ridge is between planar portions of the clamp. In the neutral position, the planar portions are each substantially in a parallel plane or angled towards that plane defined by wall portion 64. For example, downwardly angled side 60*g* is adjoining, coupled to, a planar section 60*h* on which outboard end 60*c* is defined. Of course, outboard end 60*c* may include a raised, upwardly angled lip such that the planar portion is positioned between the lip and the angled side 60*g*.

Figure 11:
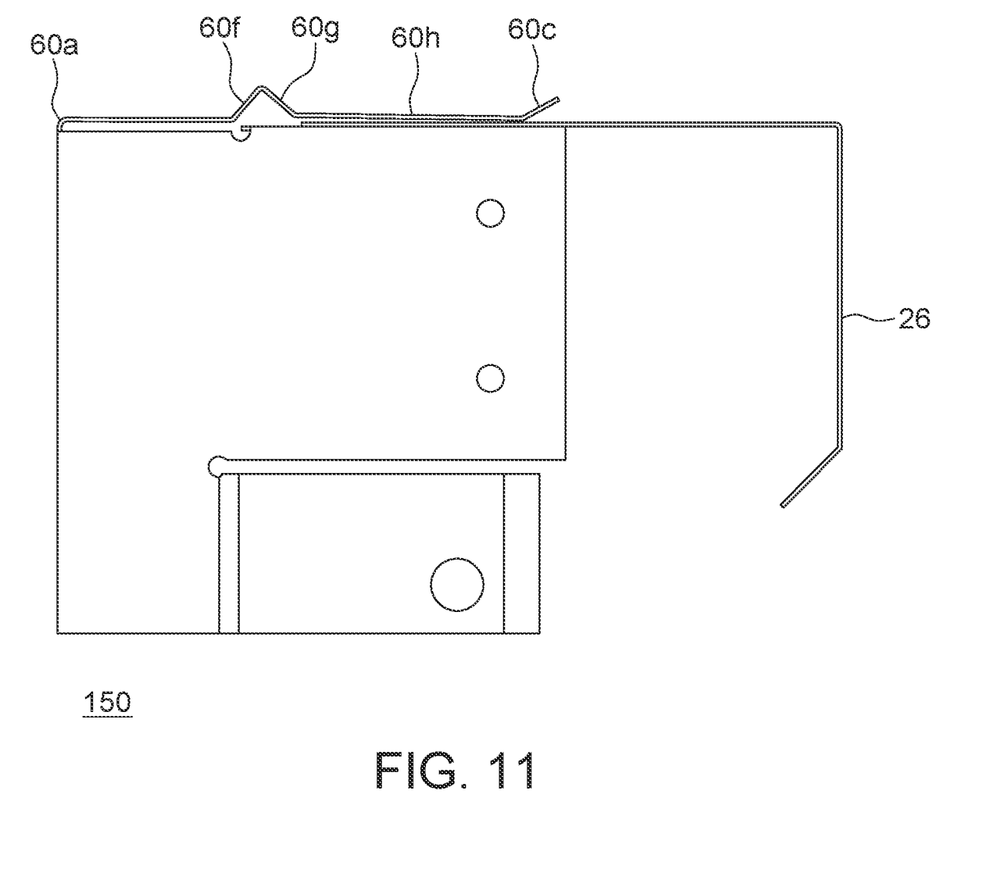
FIG. 11 is similar to FIG. 10 but with a horizontal beam installed thereon.
Figure 12:
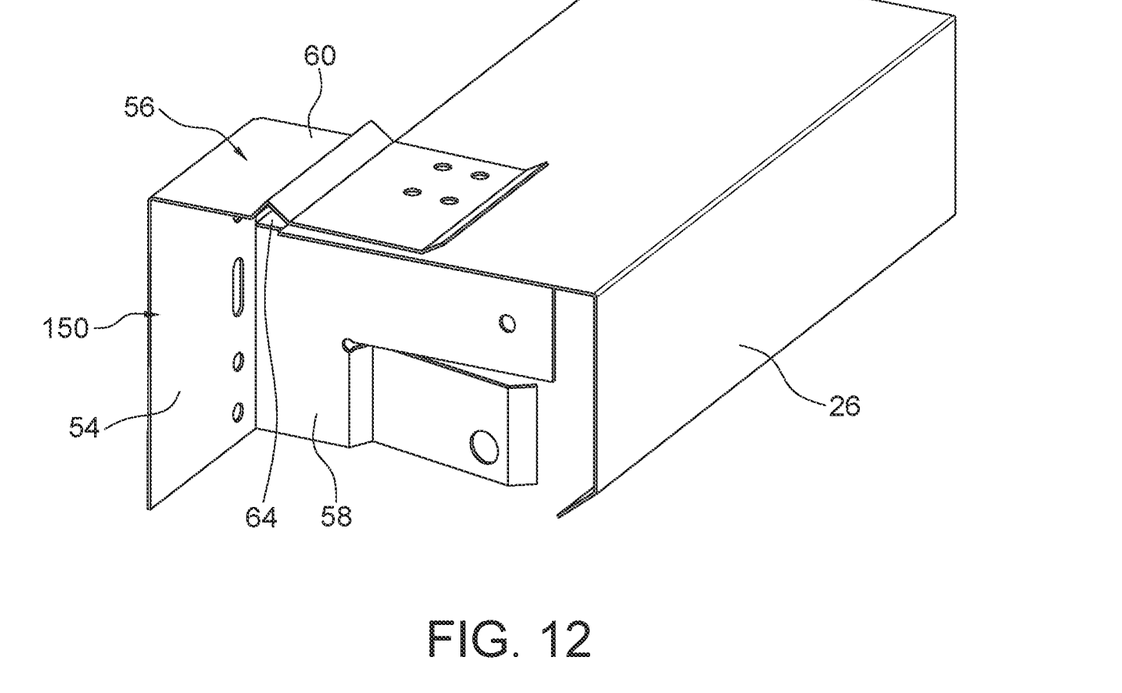
FIG. 12 is a front, top, open side isometric view of FIG. 11.

FIGS. 11 and 12 show a beam 26 inserted into slot 62 and held under clamp 60. The bias in the clamp pinches the beam securely against wall 64 and the angled section, specifically the ridge and angled side 60*g* ensures that the planar section lies close against the surface of the beam to encourage frictional engagement between the interfacing surfaces of clamp 60, beam 26 and wall 64. In one embodiment, the clamp is sized to provide for up to 305 mm depth of penetration. In particular, side edges 60*b* are up to 305 mm long between outboard end 60*c* and coupled end 60*a*. As such, the beam 26 can be inserted under the clamp and adjusted to any depth of penetration between the minimum and the coupled end 60*a*.

In this embodiment, a marking 60*m* on the clamp 60 indicates the minimum amount of insertion. The marking is used instead of an indicator hole, thereby to avoid fasteners being inadvertently inserted into an indicator hole.

Clamp 60 includes a plurality of pre-punched fastener holes 60*d*, 60*dd* at different distances from outboard end 60*c* so that regardless of the depth of penetration, a fastener can be inserted through holes 60*d*, 60*dd* to engage in the beam in slot 62. Wall portion 64 also includes pre-punched fastener holes 60*d'*, 60*dd'* that align below the fastener holes on clamp 60.

To permit the cladding support 150 to be useful installed with clamp 60 on the upper end and, alternatively upside down, with clamp 60 on the lower end, there are two aligned sets of fastener holes: (i) one set with the pre-punched, regular holes 60*d* on the clamp that are aligned with the pre-punched, smaller diameter pilot holes 60*dd'* on the wall 64; and (ii) a second set with the regular holes 60*d'* on the wall, that are aligned with pre-punched, smaller diameter pilot holes 60*dd* on the clamp. As such, fasteners can be readily inserted from either the top surface of the clamp or from the underside surface of wall portion 64 by driving the fastener first into the selected regular hole 60*d*, 60*d'*.

Support 150 also includes pre-punched fastener holes 58*b* in side wall 58 for securing a vertical cladding component. Holes 58*b* are located only near the front edge, as other fastener hole locations are less useful.

Side wall 58 also includes a clamp 66 configured to receive a cladding component, such as a vertical beam. Clamp 66 has been configured to create a significant clamping force for any vertical beam inserted thereunder, for example, between wall 58 and clamp 66. In particular, connected end 66*a* has been bent to create a first crease that causes a surface 66*f* to protrude laterally outwardly beyond the outer surface plane of side wall 58 and a second crease 66*g* that angles a major planar portion 66*h* of the clamp to protrude laterally inwardly through the plane of wall 58 and out on the other side of the side wall. In other words, clamp 66 is biased to protrude from its connected end 66*a* laterally out first and then to project through the plane defined by the surface of side wall 58 to a position below top wall portion 56. Outboard end 66*c* of the clamp is therefore, in the neutral position, biased to a position on the opposite side of the side wall from the surface 66*f* at the connected end.

In operation, clamp 66 can be resiliently flexed relative to side wall 58 so outboard end 66*c* can be urged back to open a gap between the outboard end and the plane of the side wall outer surface and an edge of a cladding component can be inserted into the gap and secured between side wall 58 and clamp 66.

Side wall clamp 66 contains no pre-punched fastener holes or indicator holes. All fastener and indicator holes are eliminated from clamp 66, in an effort to prevent any cladding structures from being fastened thereto. Instead, fastener holes are only pre-punched on wall 58 and a non-apertured marking acts as the indicator for minimum insertion.

Support 150 may include a hanging port 70 for storing on a hook such as a clip, pin, lanyard or carabineer. In this embodiment, hanging port 70 is located on clamp 66. This position on clamp 66 facilitates storage on a hook, since the location on the side wall at its front bottom corner and flex in clamp facilitates the nesting of multiple parts together. In addition, locating the hanging port 70 on the clamp 66, which is at the front bottom corner of the side wall, ensures that the hook/lanyard is accessible near the front and lower edge 58*d* of side wall. The hook can remain attached to support 150 through hanging port 70 even while the support is being secured to a building structure.

Figure 6:
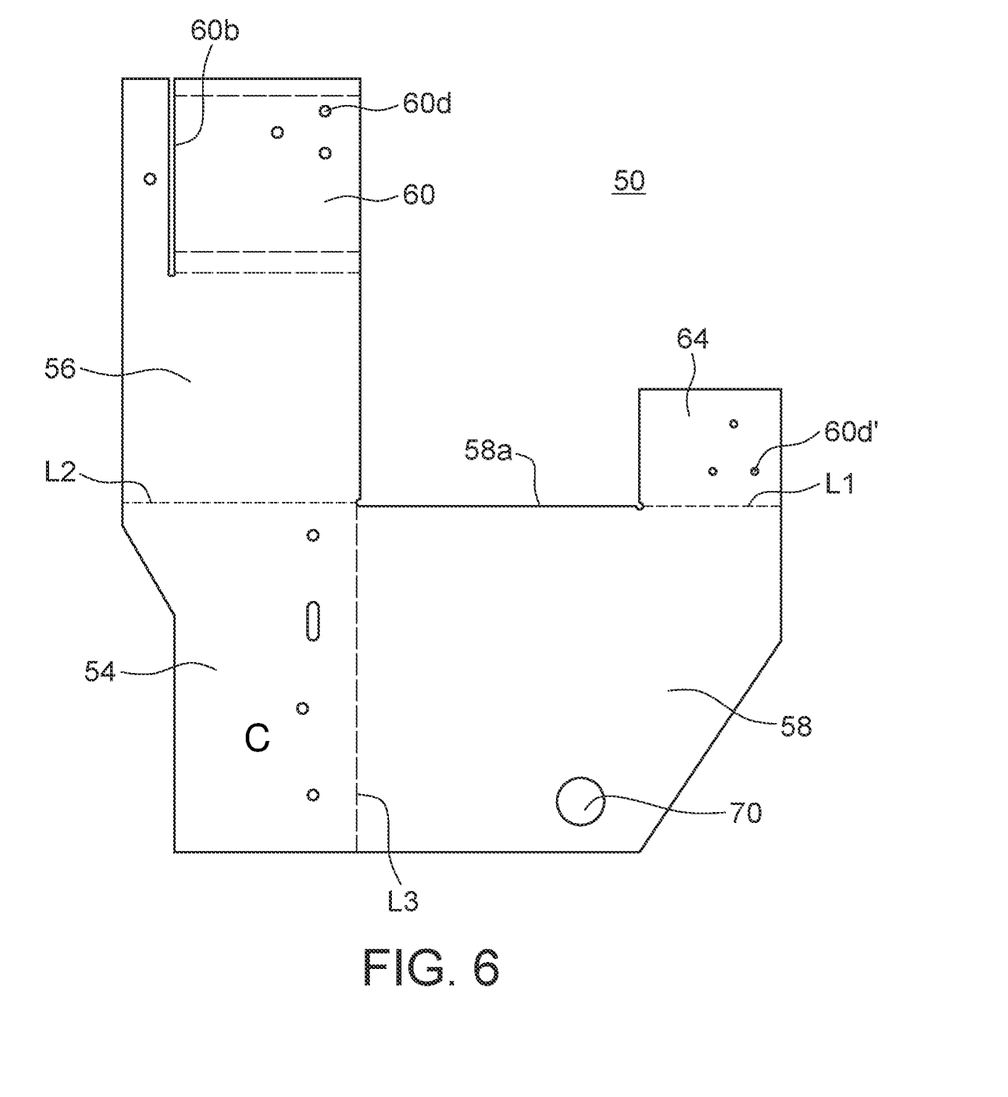
FIG. 6 is a plan view of a sheet metal structure for constructing a cladding support.
Figure 7:
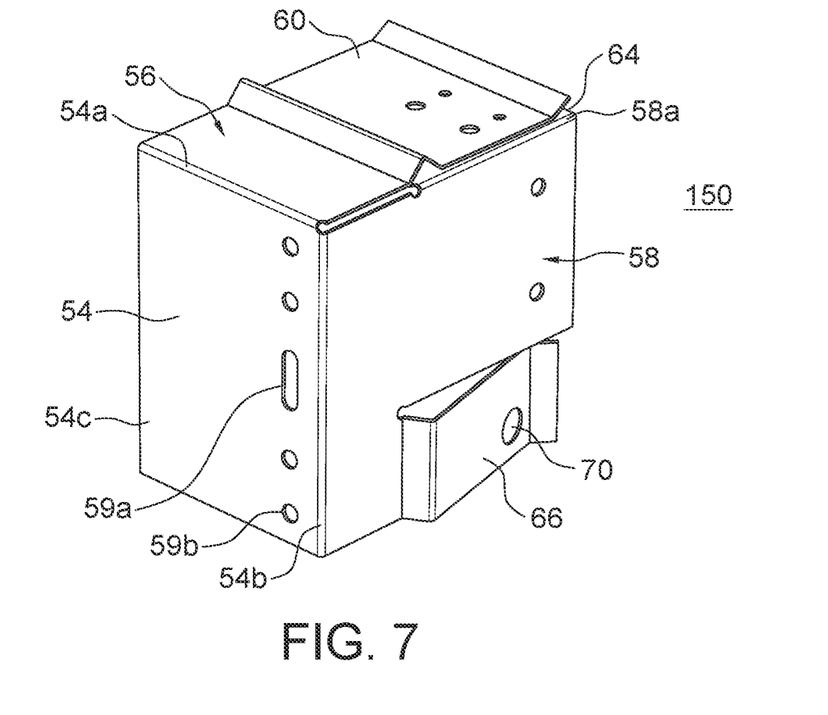
FIG. 7 is a rear, top, first side isometric view of a cladding support according to another aspect the present invention.

To construct a cladding support 50, 150 a piece of galvanized sheet steel is cut, as by laser cutting and/or punching into a generally L-shaped member. FIG. 6 shows one example of a blank useful for constructing a cladding support. A corner C of the L-shaped piece of sheet metal forms base 54 and the two extensions of the "L" form the top portion including clip 60 and side wall 58. If there is a wall portion 64, it can be formed as a tab that extends from the extension that is to become the side wall 58. The tab can extend upwardly in a direction parallel to the leg that is to become the top wall.

The plate can be punched with the fastener holes 54a, 54b, 56a, 60d, etc. and a hanging port 70.

If necessary, cuts may be made to create the side edges 60b of clamp 60. As described above, one side edge 60b of the clamp may actually be the side edge of the top wall, so only one cut may be required. If the support is to include a side wall clamp 66, cuts may be made to create the side edges 66b of that clamp. As described above, one side edge 66b of the clamp may actually be the lower edge of the side wall, so only one cut may be required to form the clamp.

Bends may made to create the live hinges in clamps 60, 66 to open the slots and to impart a clamping bias therein, as described above.

Support 50 may then be formed by permanently bending the metal. For example, the connected and outboard ends of clamp 60 and clamp 66, if it is included, to create slots 62 and ramped outboard ends 60c, 66c. If there is a tab for slot floor wall portion 64, that tab can be folded at line L1 up orthogonal to the planar surface of the extension that becomes side wall. In addition, the walls 56, 58 are formed by folding at lines L2, L3 to bend the "L" extensions upwardly, orthogonal to the planar surface of the corner, which becomes the base 54. If there is a tab for slot bottom wall 64, that tab can be inserted under clamp 60 during the wall folding operation. The insulation layer 72 can be connected, such as by adhesive coupling, to base 54 on the side opposite the protruding walls. Being galvanized steel, the bends, once formed, are substantially permanent. While there is some flex in the material, the support tends to hold its form.

To achieve the permanent folded shape and durability, 16 to 18 gauge galvanized sheet steel has been used.

The resulting support 50 is then ready for use. Support 50 offers a lightweight but strong, one-piece product that is easy to handle and use.

The type of support to be used can be selected with consideration as to whether only a top clamp or both a top and side clamp are required and/or the desired spacing between the clamp and the base. For example a selection can be made between that support of FIG. 1 and that of FIG. 5. The support of FIG. 1 work well in either for receiving either vertical or horizontal cladding installations, and therefore, have inventory benefits.

The base can be connected against a building structure by driving a fastener through slot 59a, which permits the base to be adjusted vertically. Then fasteners are driven through one or more apertures 59b to secure the base in place against the building structure. The support may be secured via a hook through a hanging port 70 to a worker, such as to a worker's work belt, or to a fixed structure at the worksite. The support may remain secured with a hook through port 70 until at least one fastener secures base 54 to the building structure. As such, accidents by dropping a support from a large height are avoided.

A plurality of supports can be releasably carried via port 70 on a hook, such as a carabineer, to a site at which they are to be employed.

The insulative layer 72 becomes positioned between the base wall 54 and the building structure and reduces thermal transfer through the support.

If the support is intended to hold a horizontal beam 26, further supports are installed along a horizontal line spaced from the first-installed support. Care is taken to adjust the supports such that their slots 62 substantially line up horizontally. The beam is then inserted into slots 62 on the horizontally aligned supports. The depth of penetration of the beam beneath clamp 60 can be slid back and forth, FIG. 4, arrow A, to adjust for how far the cladding is to be offset from the wall and how true the wall is. Fasteners can then be secured through fastener holes 60d and 56a to couple the beam to the support.

If the support is intended to hold a vertical beam 26, as shown in FIG. 1, further supports are installed along a vertical line spaced from the first-installed support. Care is taken to adjust the supports such that their clamps 66 substantially line up vertically. The beam is then inserted into slots of clamps 66. The depth of penetration of the beam beneath clamp 66 can be adjusted to select how far the cladding is to be offset from the building structure and to accommodate deviation in the planar surface of the building structure. Initially, fasteners can be secured through fastener slots 58c to hold the vertical beam, while the depth adjustments are made. Then, further fasteners can then be secured through fastener holes 58b and 66d to couple the beam to the support.

The above detailed description of example embodiments is not intended to be exhaustive or to limit this disclosure and claims to the precise forms disclosed above. While specific examples of, and examples for, embodiments are described above for illustrative purposes, various equivalent modifications are possible within the scope of the technology, as those skilled in the relevant art will recognize.

What is claimed is:

1. A cladding installation support device comprising:
  a folded sheet metal body including:
    a base wall;
    a side wall protruding from the base wall and having an upper edge;
    a top wall portion protruding out substantially orthogonally relative to the base wall, the top wall portion including a clamp, the clamp including side edges extending between a coupled end to which the clamp is coupled to the folded sheet metal body and an outboard end, and the clamp having one side edge extending along the upper edge of the side wall.

2. The device according to claim 1, wherein top wall portion includes a planar wall and the clamp is bent up into position offset above the planar wall.

3. The device according to claim 1, further comprising a side wall clamp with a connected end bent laterally out into position protruding out from a plane defined by an outer planar surface of the side wall.

4. The device according to claim 3, wherein the side wall clamp is biased to project through the plane such that an outboard end of the side wall clamp projects below the top wall portion.

5. The device according to claim 1, further comprising a fastener aperture and a hanging port having a diameter at least three times larger than the fastener aperture.

6. The device according to claim 5, wherein the hanging port extends through the side wall adjacent a lower, front edge thereof.

7. The device according to claim 1, wherein the clamp further comprises a ridge protruding upwardly relative to a plane across the top wall portion, the ridge spaced from an outboard end of the clamp and extending from side edge to side edge on the clamp, the ridge including a first upwardly bent angled surface and a second downwardly bent angled surface, and a planar portion between the ridge and the outboard end, the planar portion biased at least close to a lower wall portion of the top wall portion.

8. A method of constructing a cladding support device, the method comprising:

bending an L-shaped piece of sheet steel to create a base, a top wall portion extending substantially orthogonal from the base and a side wall extending substantially orthogonal from the base, such that the top wall portion is adjacent and extends along a top edge of the side wall and each of the top wall portion and the side wall have front edges opposite to the base; and bending a portion of the top wall portion into a clamp.

9. The method of claim 8 further comprising bending a tab on the side wall to a position underlying the clamp, wherein the tab defines a portion of the top wall portion below the clamp.

10. The method of claim 9 wherein further comprising shaping the clamp to include a ridge protruding upwardly relative to a plane across the top wall portion, the ridge spaced from an outboard end of the clamp and extending from side to side on the clamp, the ridge including a first upwardly bent angled surface and a second downwardly bent angled surface, and the shaping defining a planar portion between the ridge and the outboard end, the planar portion biased at least close to the tab.

\* \* \* \* \*